(12) United States Patent
Handa et al.

(10) Patent No.: US 6,467,565 B1
(45) Date of Patent: Oct. 22, 2002

(54) SHAFT DRIVE TYPE POWER TRANSMISSION

(75) Inventors: Akio Handa; Bunzo Seki, both of Saitama (JP)

(73) Assignee: Honda Giken Gokyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 09/655,455

(22) Filed: Sep. 5, 2000

(30) Foreign Application Priority Data

Sep. 5, 1999 (JP) .......... 11-291427
Oct. 19, 1999 (JP) .......... 11-297079

(51) Int. Cl.[7] .......... B62M 17/00; B60K 17/04
(52) U.S. Cl. .......... 180/383; 180/384; 464/153; 464/154; 464/182; 403/359.5
(58) Field of Search .......... 180/248, 233, 180/383, 384; 464/153, 154, 182, 901; 403/359.5, 359.1

(56) References Cited

U.S. PATENT DOCUMENTS

| | | | | |
|---|---|---|---|---|
| 3,531,144 A | * | 9/1970 | Bizilia | 403/326 |
| 3,832,076 A | * | 8/1974 | Gehrke | 403/359.5 |
| 4,224,808 A | * | 9/1980 | Gehrke | 277/430 |
| 4,540,061 A | * | 9/1985 | Watanabe | 180/215 |
| 5,183,351 A | * | 2/1993 | Schneider | 277/636 |
| 5,499,884 A | * | 3/1996 | Kuhnhold et al. | 403/326 |
| 5,667,332 A | * | 9/1997 | Lindholm | 403/326 |
| 6,182,784 B1 | * | 2/2001 | Pestotnik | 180/337 |
| 6,182,785 B1 | * | 2/2001 | Handa et al. | 180/383 |

FOREIGN PATENT DOCUMENTS

JP 636399 2/1988

* cited by examiner

*Primary Examiner*—Paul N. Dickson
*Assistant Examiner*—Ruth Ilan
(74) *Attorney, Agent, or Firm*—Birch, Stewart, Kolasch & Birch, LLP (57) ABSTRACT

A joint is sub-assembled on a front wheel propeller shaft side of a vehicle by integrally fitting one end of the joint to one end of the front wheel propeller shaft and covering the connection portion with a boot. This arrangement provides a shaft drive mechanism capable of easily assembling a propeller shaft with a pinion gear via a joint. The leading end side of the joint is fitted on a small-diameter boss of a pinion gear supported by a front wheel gear case. The joint is spline-connected so that it is integrally rotatably connected to the boss of the pinion gear. A C-shaped clip previously mounted on the small-diameter boss is engaged on the joint side in order to prevent the spline of the joint from slipping off from the spline of the pinion gear.

13 Claims, 12 Drawing Sheets

SHAFT DRIVE TYPE POWER TRANSMISSION

BACKGROUND OF THE INVENTION

1. Field of the Invention

The present invention relates to a shaft drive type power transmission, particularly to a shaft drive type power transmission intended to simplify the connection between a propeller shaft and a pinion gear supported by a gear case.

2. Background Art

Figure 11:
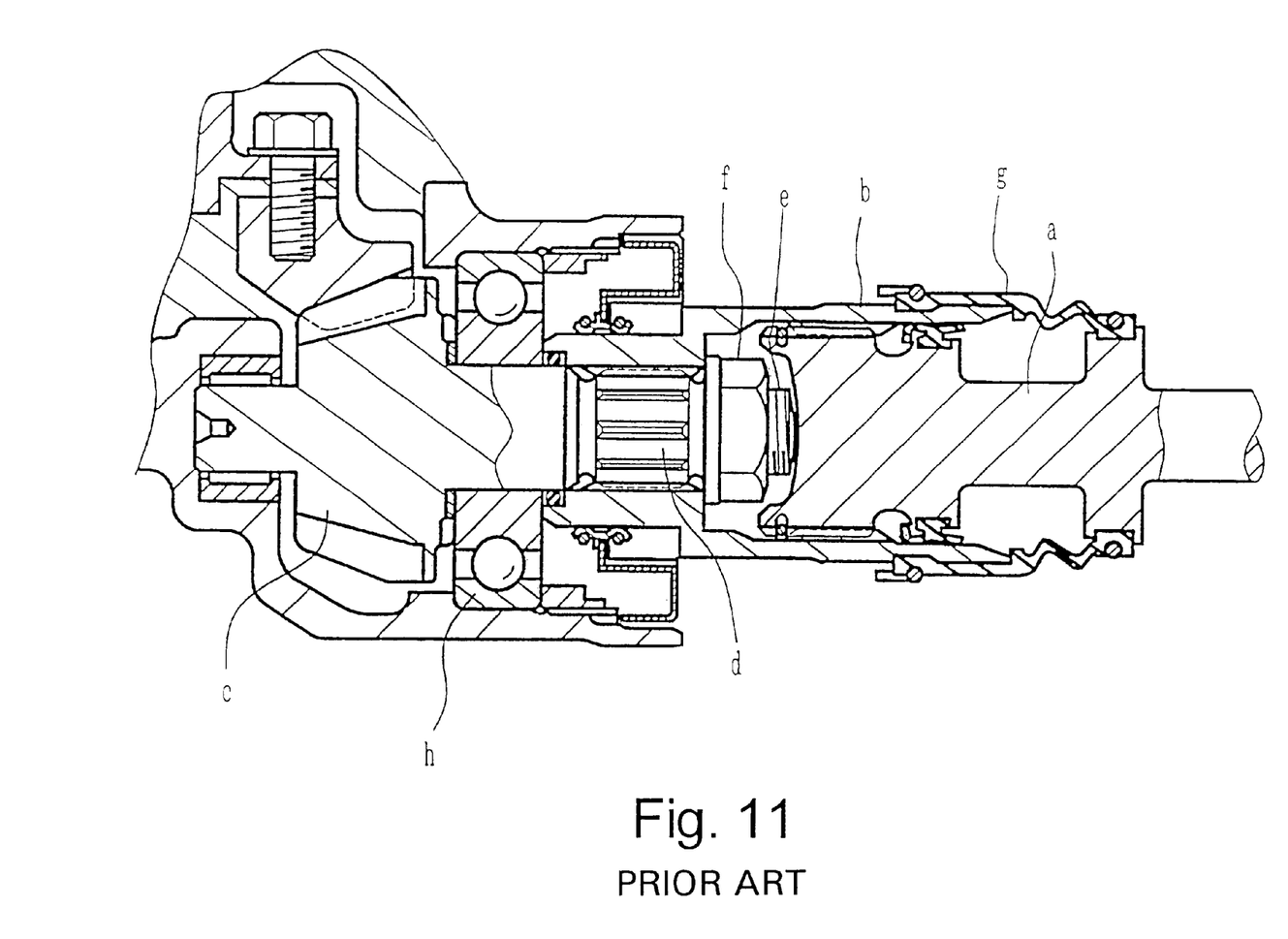
FIG. 11 is a view, similar to FIG. 1, showing a prior art structure.

A prior art connection structure of a shaft drive type power transmission in which a propeller shaft is connected to a pinion gear via a joint "b" is shown in FIG. 11. As shown in FIG. 11, a boss "d" of a pinion gear "c" is splined-connected to one end of the joint "b", and the joint "b" is integrated with the pinion gear "c" by fastening a nut "f" to a thread portion "e" formed on the boss "d". In this way, the joint "b" is sub-assembled with the pinion gear "c" on the gear case side. It should be noted that at this connection step, one end of the joint "b" is butted to a bearing "h" for rotatably supporting the pinion gear "c".

A propeller shaft "a" is then spline-connected to the other end of the joint "b", and one end of a boot "g" having the other end previously fixed to the outer periphery of one of the propeller shaft "a" and the joint "b" is fixed to the outer periphery of the other of the propeller shaft "a" and the joint "b". This type of connection structure has been disclosed, for example, in Japanese Patent Publication No. Sho 63-6399.

Figure 12:
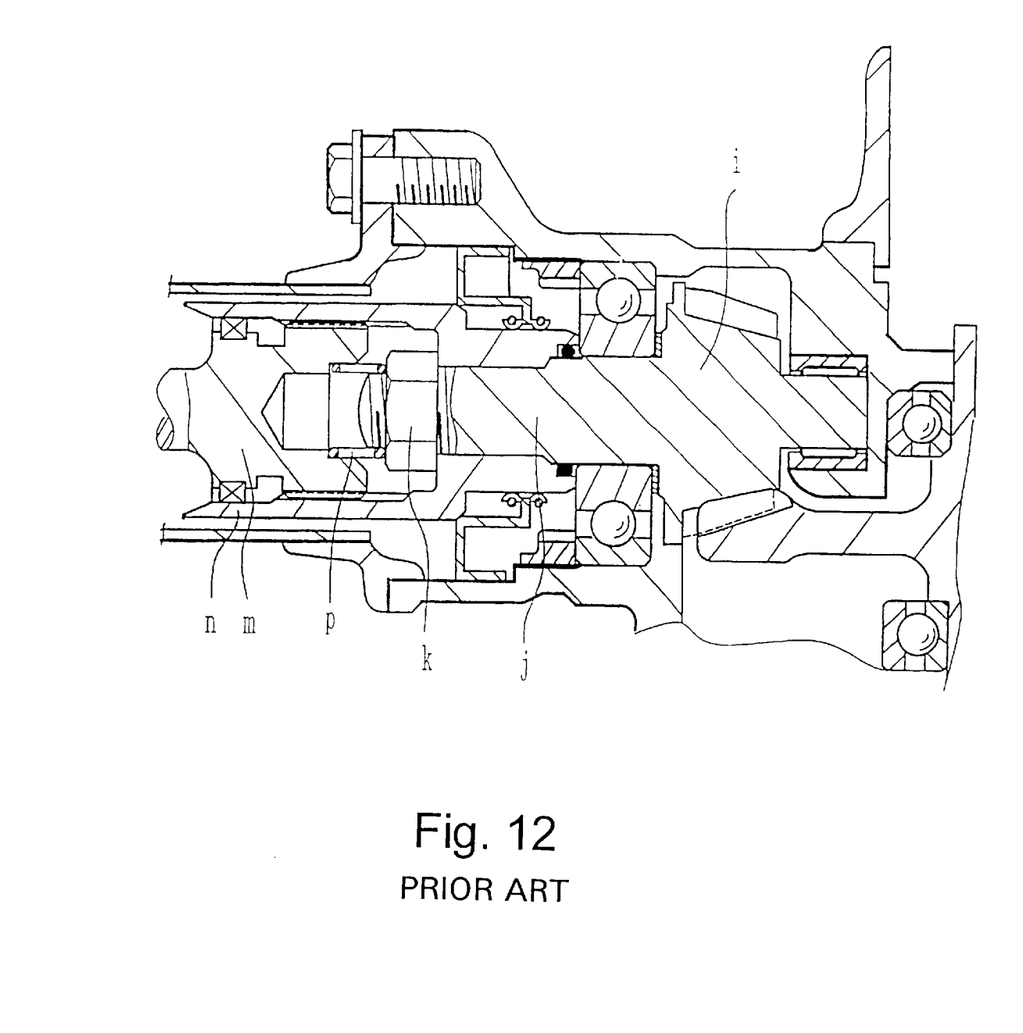
FIG. 12 is a sectional view, showing another prior art structure.

FIG. 12 is a view showing a prior art connection structure on the rear wheel side. Like the above connection structure, a joint "n" is fixed to a boss "j" of a pinion gear "i" by fastening a nut "k" to a threaded portion formed on the boss "j." In FIG. 12, character "m" designates a rear end portion of a rear wheel side drive shaft spline-connected to the joint "n", and "p" is a spring.

According to the above-described prior art, since the joint "b" is sub-assembled with the pinion gear "c" on the gear case side by using a nut "f", the boot "g" must be mounted, after the propeller shaft "a" is connected to the joint "b." Since the joint "b" is sub-assembled with the pinion gear "c" on the connection portion between the propeller shaft "a" and the joint "b," it is difficult to mount the boot "g" on the connection portion between the propeller shaft "a" and the joint "b". Also, since the joint "b" is fixed to the pinion gear "c" by using the nut "f", the boss of the pinion gear "c" to which the nut "f" is to be fastened must be threaded. This inherently increases the number of manufacturing steps and the required number of parts.

SUMMARY OF THE INVENTION

The present invention overcomes the shortcomings associated with the prior art and achieves other advantages not realized by the prior art.

Accordingly, it is an object of the present invention to provide a connection between a pinion gear and a propeller drive shaft that is simplified in construction, relatively easily maintained, requires few assembling steps, and ensures solid, reliable connection between mating parts.

It is a further object of the present invention provide a leading end of the joint abutted to a stepped portion of the pinion gear.

It is a further object of the present invention to reduce the requirements of the pinion gear from compensating for axial forces.

These and other objects are accomplished by a shaft drive power transmission for a vehicle in which a propeller drive shaft is connected to a pinion gear on a gear case side of the propeller drive shaft, said transmission comprising a boss of said pinion gear having at least a first diameter portion, a second diameter portion and a third diameter portion, wherein said third diameter portion is larger in diameter than said second diameter portion and said second diameter portion is larger in diameter than said first diameter portion and said first diameter portion is adjacent to said propeller drive shaft; a joint for connecting the pinion gear to the propeller drive shaft, said joint having a shaft end and a pinion end, wherein said shaft end of said joint is operatively spline-connected to said propeller shaft with a spline connection and said pinion end of said joint is operatively spline-connected to said third diameter portion of said boss of said pinion gear with a spline connection and in such a manner as to be integrally connected and rotatable therewith, and wherein the joint is prevented from slipping off of the boss of said pinion gear.

These and other objects are also accomplished by a shaft drive power transmission for a vehicle, said transmission comprising an output shaft transmitting power from a power unit of the vehicle; a front wheel propeller shaft connected to a front end of said output shaft; a right front wheel axle and a left front wheel axle; a front wheel drive case; a pinion gear for distributing drive forces from said front wheel propeller shaft to said right and left front wheel axles; and a boss of said pinion gear having at least a first diameter portion, a second diameter portion and a third diameter portion, wherein said third diameter portion is larger in diameter than said second diameter portion and said second diameter portion is larger in diameter than said first diameter portion; a joint for connecting the pinion gear to the propeller drive shaft, said joint having a shaft end and a pinion end, wherein said shaft end of said joint is operatively spline-connected to said propeller shaft with a spline connection and said pinion end of said joint is operatively spline-connected to said third diameter portion of said boss of said pinion gear with a spline connection and in such a manner as to be integrally connected and rotatable therewith, and wherein the joint is prevented from slipping off of the boss of said pinion gear.

According a first aspect of the present invention, since the joint is fitted to the pinion gear in such a manner as to be integrally rotatable therewith and not to be slipped off therefrom, it is possible to sub-assemble the joint with the propeller shaft, and hence to simplify the assembling process. Further, since it is possible to eliminate the need of fastening the joint to the pinion gear by using a nut as in the prior art structure, it is possible to eliminate the need of threading the boss of the pinion gear and hence to reduce the number of the machining steps and also reduce the number of parts by omitting the nut.

According to a second aspect of the present invention, since the outer periphery of the connection portion between the joint and the propeller shaft is covered with the boot at the step of sub-assembling the joint to the propeller shaft, it is possible to eliminate the need of mounting the boot while connecting the propeller shaft to the pinion gear as in the prior art structure, and hence to omit such a difficult mounting step from the assembly process.

According to a third aspect of the present invention, since the leading end of the joint is abutted to the stepped portion of the pinion gear, the bearing for rotatably supporting the pinion gear can be configured as a common small-sized bearing, thereby resulting in a reduction in the material cost.

According to a fourth aspect of the present invention, since the teeth of the pinion gear are each formed with a straight shape, a reaction force applied upon acceleration/deceleration is, unlike the prior art bevel gear, transmitted not in the axial direction but substantially in the rotational direction. Since the reaction force does not act as a load applied in the axial slip-off direction, it is possible to omit the provision of the nut of the prior art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 2:
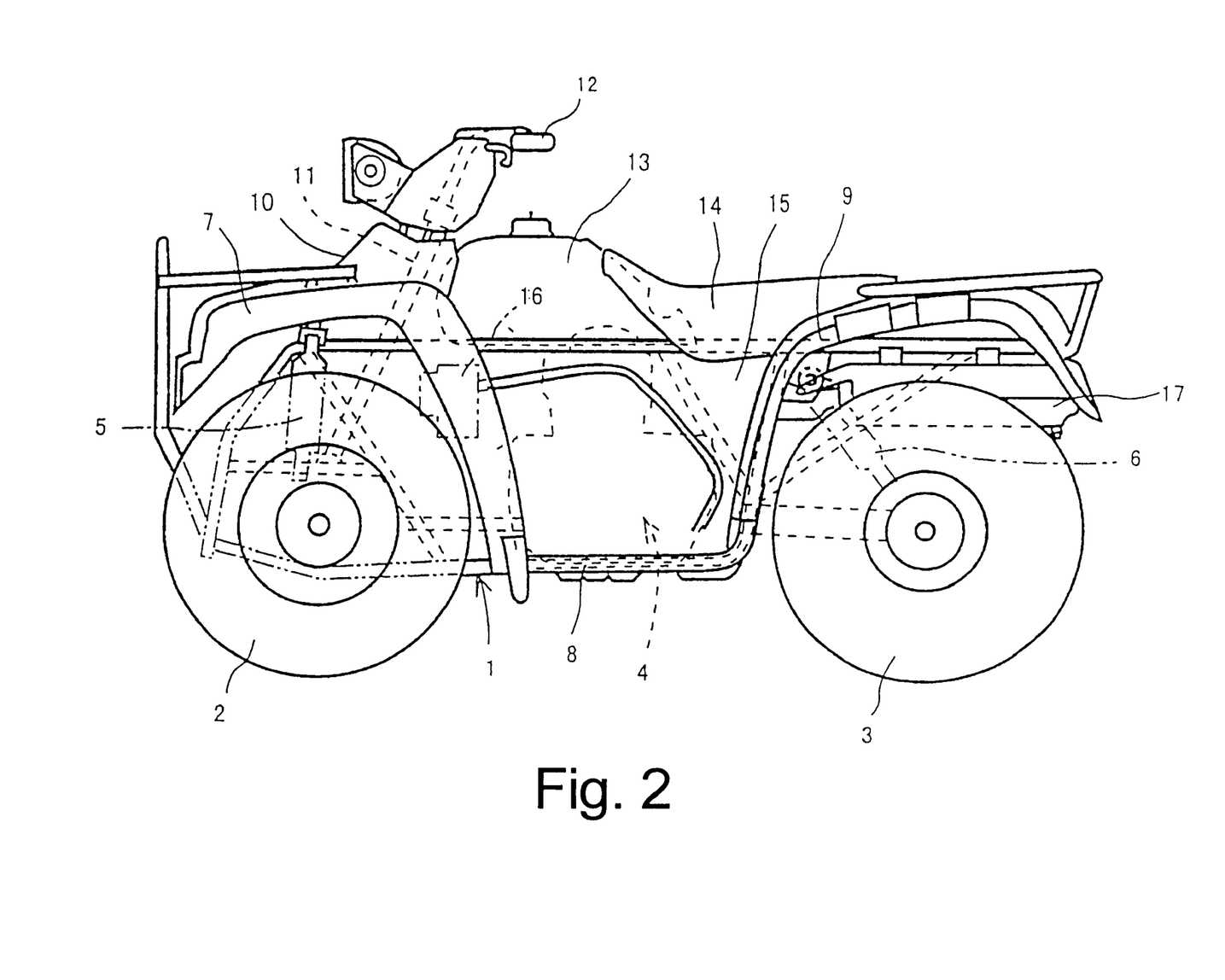
FIG. 2 is a side view of a four-wheel buggy to which the present invention is applied.
Figure 3:
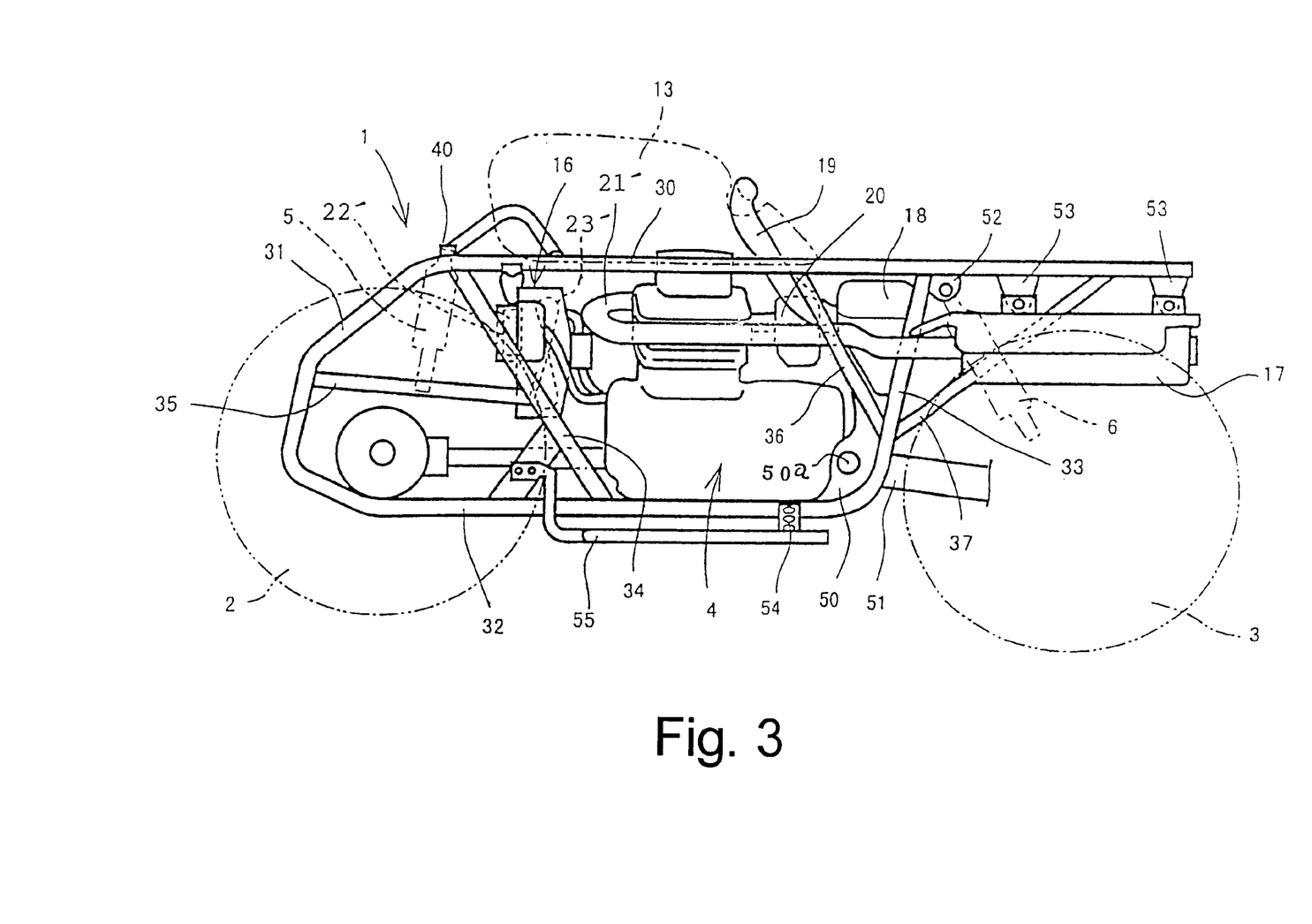
FIG. 3 is a side view of a main portion of the vehicular body of the four-wheel buggy.
Figure 4:
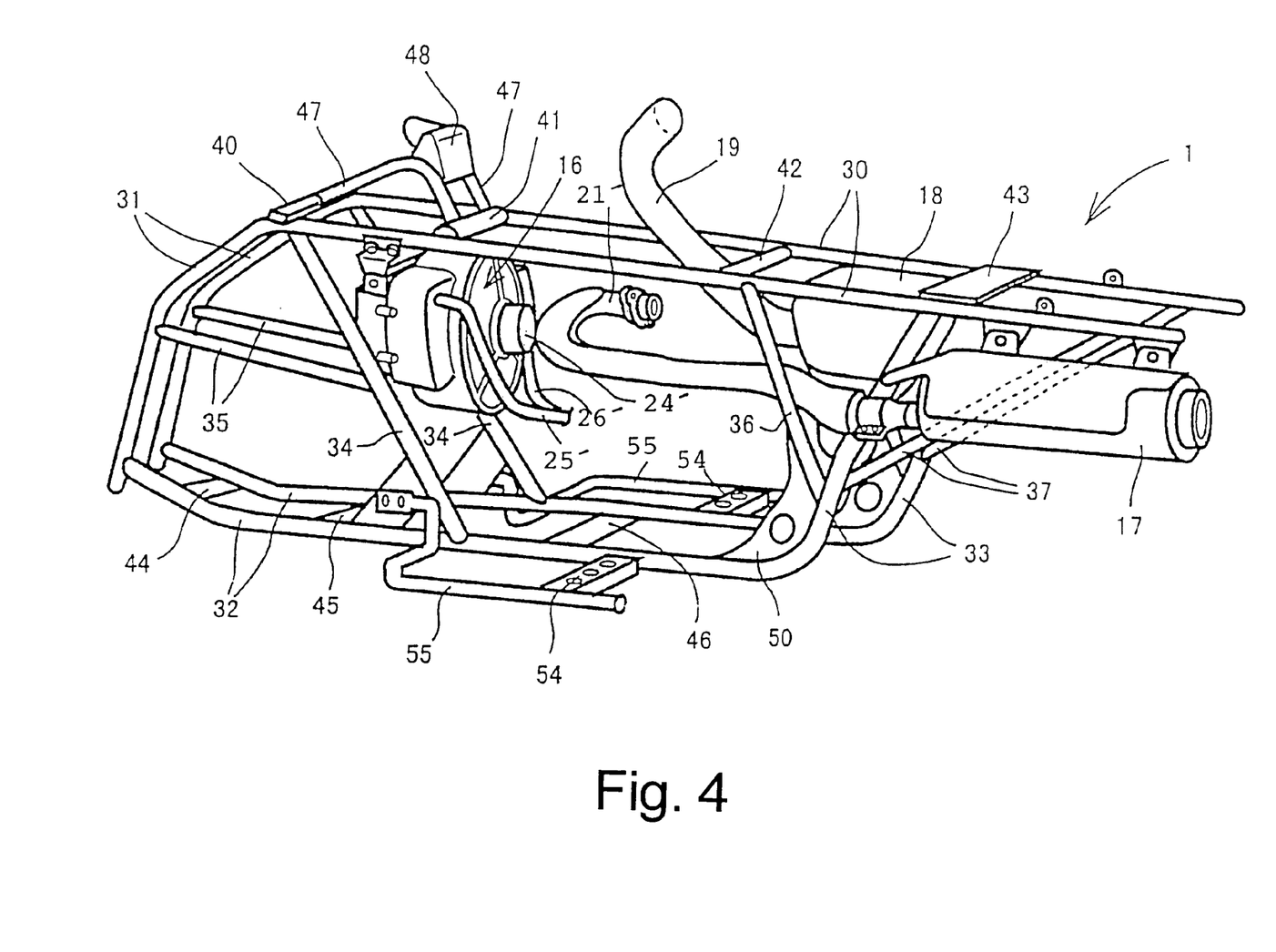
FIG. 4 is a perspective view of the main portion of the vehicular body of the four-wheel buggy.

An embodiment of the present invention as applied to a four-wheel buggy will now be described with reference to the accompanying figures. First, the entire configuration of a vehicular body of the buggy will be described. FIG. 2 is a side view of a four-wheel buggy to which the present invention is applied. FIG. 3 is a side view of a main portion of the vehicular body of the four-wheel buggy. FIG. 4 is a perspective view of the main portion of the vehicular body of the four-wheel buggy shown in FIG. 3.

A pair of right and left front wheels 2 and a pair of right and left rear wheels 3, each of which is formed of a low pressure balloon tire, are supported on a front portion and a rear portion of a body frame 1 of the buggy, respectively. These front and rear wheels 2 and 3 are driven by a power unit 4 mounted on a central portion of the body frame 1. The front and rear wheels 2 and 3 are suspended from the body frame 1 by means of a front cushion 5 and a rear cushion 6.

In FIG. 2, a front fender 7, a sub-fender 8, a rear fender 9, a front panel 10, a steering shaft 11, a handlebar 12, a fuel tank 13, a saddle type seat 14, a rear panel 15, a cooling unit 16, and a muffler 17 are shown. In FIG. 3, an air cleaner 18, a snorkel type duct 19, and a carburetor 20 for a four-wheel buggy are shown.

A structure of the body frame 1 will be described hereinafter. As shown in FIG. 3 and FIG. 4, the body frame 1 includes a pair of right and left upper pipes 30 which are nearly parallel to each other. The body frame 1 also includes a pair of right and left front pipes 31, a pair of right and left lower pipes 32, and a pair of right and left center pipes 33. The upper pipes 30 extend in a straight line along the longitudinal direction of the vehicle body frame 1. The front pipes 31 extend in a vertical direction from the front ends of the upper pipes 30. The lower pipes 32 extend rearwardly from the lower ends of the front pipes 31. The center pipes 33 extend upwardly from the rear ends of the lower pipes 32. The rear ends of the center pipes 33 are connected to points of the upper pipes 30. These points where the rear ends of the center pipes 33 are connected to the upper pipes are offset rearwardly from intermediate points of the upper pipes 30.

The body frame 1 further includes a pair of right and left front reinforcing pipes 34, a pair of right and left intermediate pipes 35, a pair of right and left rear reinforcing pipes 36, and a second pair of right and left rear reinforcing pipes 37. The reinforcing pipes 34 extend obliquely and connect the front ends of the upper pipes 30 to points of the lower pipes 32 located on the front half sides of the lower pipes 32. The intermediate pipes 35 extend in the longitudinal direction and connect intermediate points of the reinforcing pipes 34 to intermediate points of the front pipes 31. The reinforcing pipes 36 extend obliquely and connect intermediate points of the center pipes 33 to points of the upper pipes 30 offset forwardly from the connection points between the upper pipes 30 and the center pipes 33.

The reinforcing pipes 37 extend obliquely and connect intermediate points of the center pipes 33 to points of the upper pipes 30 offset rearwardly from the connection points of the upper pipes 30 and the center pipes 33. A front cushion bracket 40, cross pipes 41 and 42, and cross members 43, 44, 45, and 46 are provided between the above-described right and left members. In this way, all the above-described members are integrally connected to each other, to form the body frame 1.

The front cushion bracket 40 is provided between the front ends of the right and left upper pipes 30. The front cushion bracket 40 is connected to the cross pipe 41 disposed at the back of and in parallel to the front cushion bracket 40 by a pair of right and left head portion pipes 47. The head portion pipe 47, which is formed into a chevron shape when viewed from the side, extends in the longitudinal direction of the vehicle. A stay 48 for rotatably supporting an upper portion of the steering shaft 11 is provided on the tops of the head portion pipes 47. The lower end of the steering shaft 11 is rotatably supported by bearing portions provided on the intermediate pipes 35.

The upper end of the front cushion 5 is supported by the right and left ends of the front cushion bracket 40, and the lower end of the front cushion 5 is mounted to an upper arm constituting a double wish bone type front wheel suspension (not shown). The upper arm is swingably supported by the intermediate pipes 35, and a lower arm paired with the upper arm is swingably supported by the front ends of the lower pipes 32.

A pivot plate 50 is provided at a corner portion between the lower portion of the center pipe 33 and the rear end of the lower pipe 32. The front end of a rear swing arm 51 is swingably supported by the pivot plates 50. The rear swing arm 51 houses a drive shaft constituting a rear wheel drive mechanism.

The upper pipes 30 extend rearwardly from the connection points to the center pipes 33, and a stay 52 for supporting the upper end of the rear cushion 6 and stays 53 for supporting a muffler 17 are provided on the portions, extending rearwardly from the connection points to the center pipes 33, of the upper pipes 30.

The rear end of the muffler 17 is connected to an exhaust pipe 21' that extends forwardly, nearly in straight line. The front end of the exhaust pipe 21' is curved in an approximately U-shape and is connected to an exhaust port provided in a cylinder head of the power unit 4. A cooling unit 16 disposed in front of the power unit 4 is suspended from the upper pipes 30. The cooling unit 16 includes an oil cooler 22' and a cooling fan 23' integrated with the oil cooler 22'. A motor 24' for the cooling unit and hoses 25' and 26' are connected to the power unit 4.

A step 54 extending outwardly from the vehicle frame 1 where power unit 4 is provided and is provided on portions of each of the right and left lower pipes 32. A leading end of the step 54 extending outwardly from the lower pipe 32 is connected to the lower pipe 32 via a curved step frame 55. A sub-fender 8 is mounted on the step 54 and the step frame 55. Although the sub-fender 8 on the right side of the vehicular body is not shown in the figure, it is comparable to the sub-fender 8 shown on the left side of the vehicular body.

Figure 5:
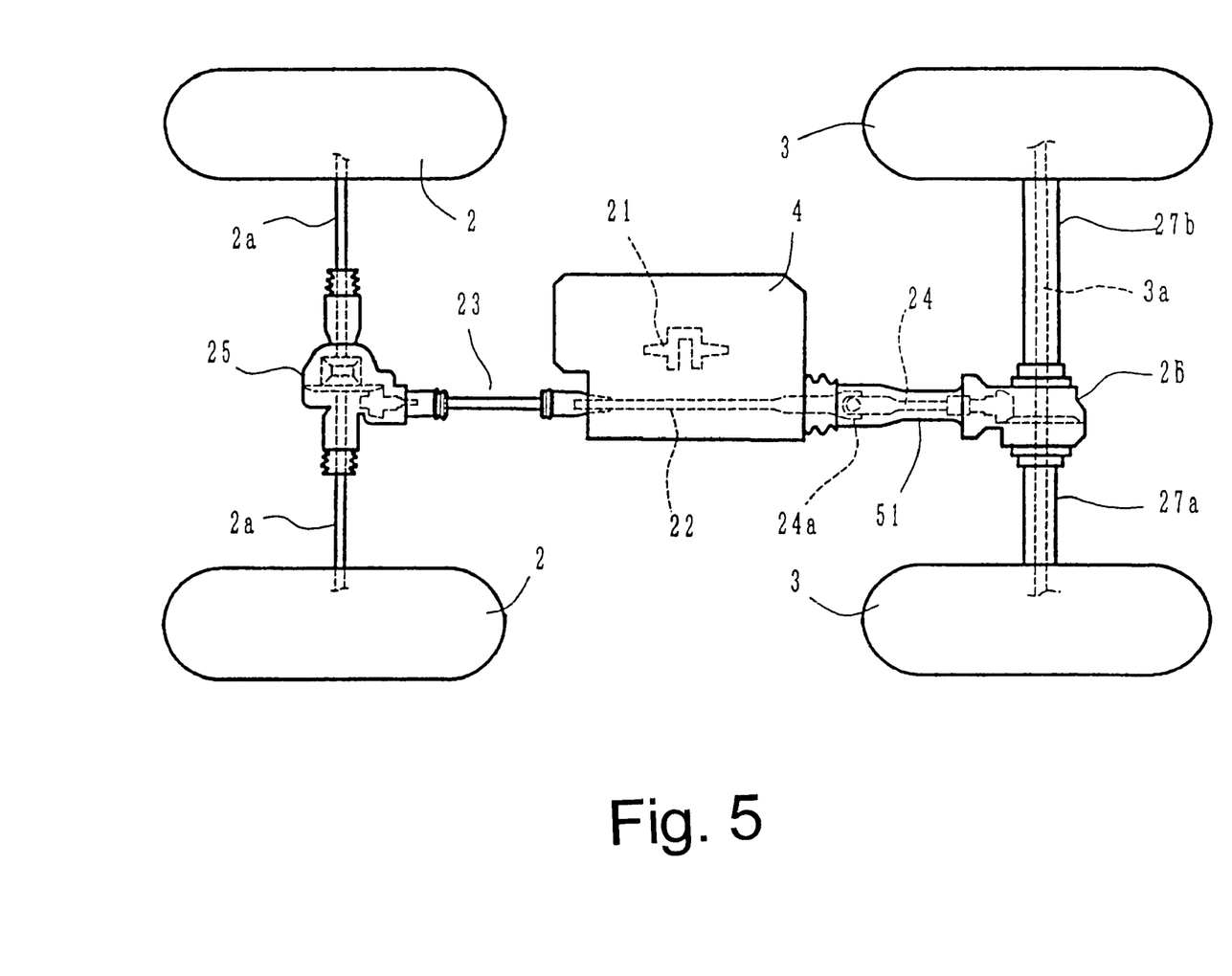
FIG. 5 is a schematic plan view of a power transmission structure of the four-wheel buggy.

A power transmission system will be described hereinafter with respect to the accompanying figures. FIG. 5 schematically shows a power transmission system of the four-wheel buggy. A crankshaft 21 of the power unit 4 extends in the longitudinal direction of the vehicle. An output shaft 22 also extends in the longitudinal direction of the vehicle so that it is substantially in parallel with the crankshaft 21. The front end of the output shaft 22 is connected to a front wheel propeller shaft 23, and the rear end of the output shaft 22 is connected to a rear wheel propeller shaft 24.

The front end of the front wheel propeller shaft 23 is connected to a front wheel gear case 25. A drive force is distributed to right and left front wheel axles 2a at the front wheel gear case 25. This arrangement ensures that the right and left front wheels 2 can be independently driven. The rear wheel propeller shaft 24 is housed in the rear swing arm 51 formed of a hollow shaft arm, and the front end of the rear wheel propeller shaft 24 is connected to the output shaft 22 via a universal joint 24a.

The front end of the rear swing arm 51 is swingably supported by a pivot 50a (see FIG. 3) provided between the pivot plates 50. The universal joint 24a is positioned coaxially with the pivot 50a. The rear end of the rear wheel propeller shaft 24 is connected to a rear wheel gear case 26. A drive force is distributed to right and left rear wheel axles 3a at the rear wheel gear case 26 in order to independently drive the right and left rear wheels 3. In the figures, reference numerals 27a and 27b designate axle pipes.

Figures 1, 1A:
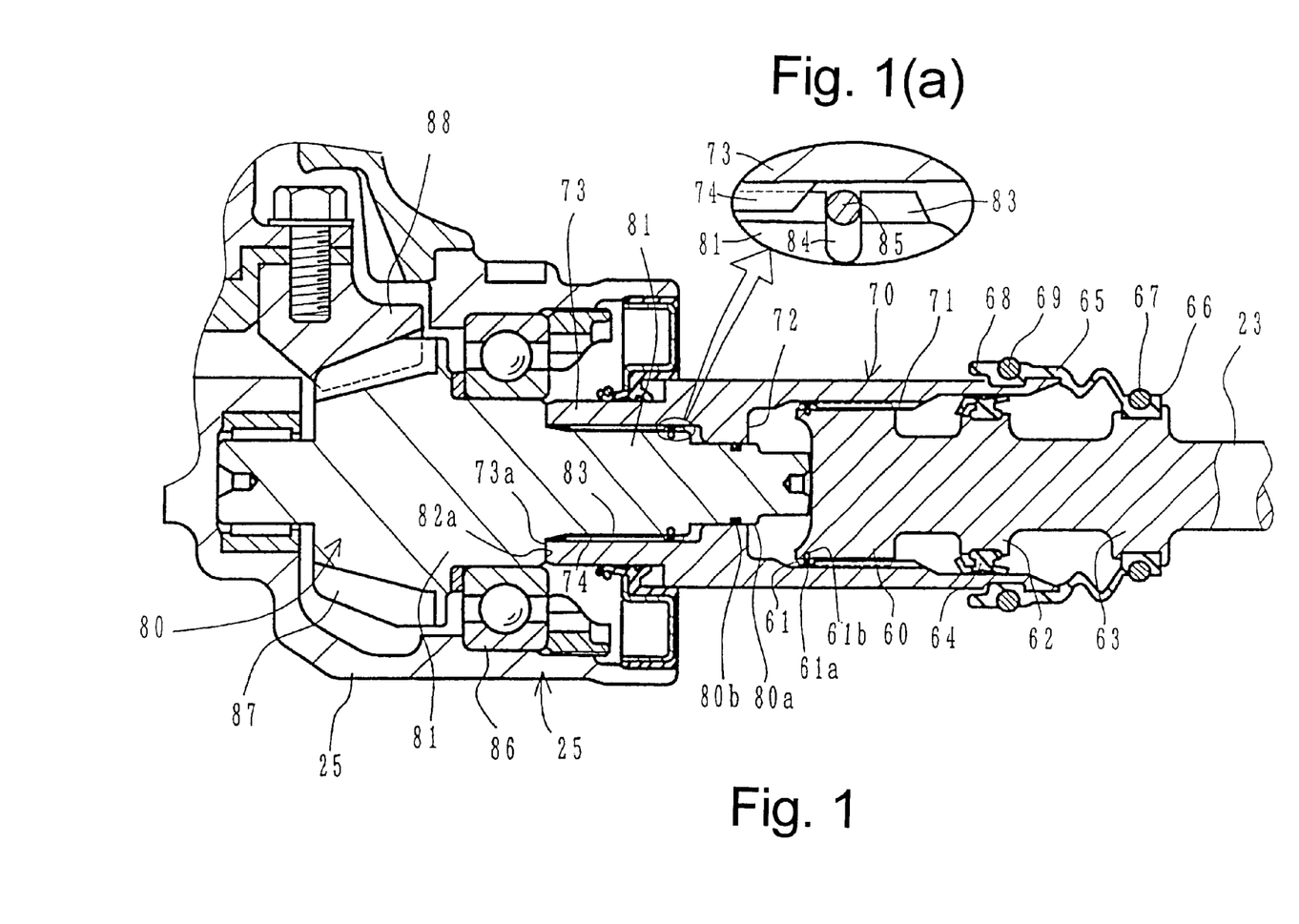
FIG. 1 is a sectional view of a front wheel side power transmission mechanism according to an embodiment of the present invention.
FIG. 1a is an enlarged view of a portion of the front wheel side power transmission mechanism shown in FIG. 1.
Figure 6:
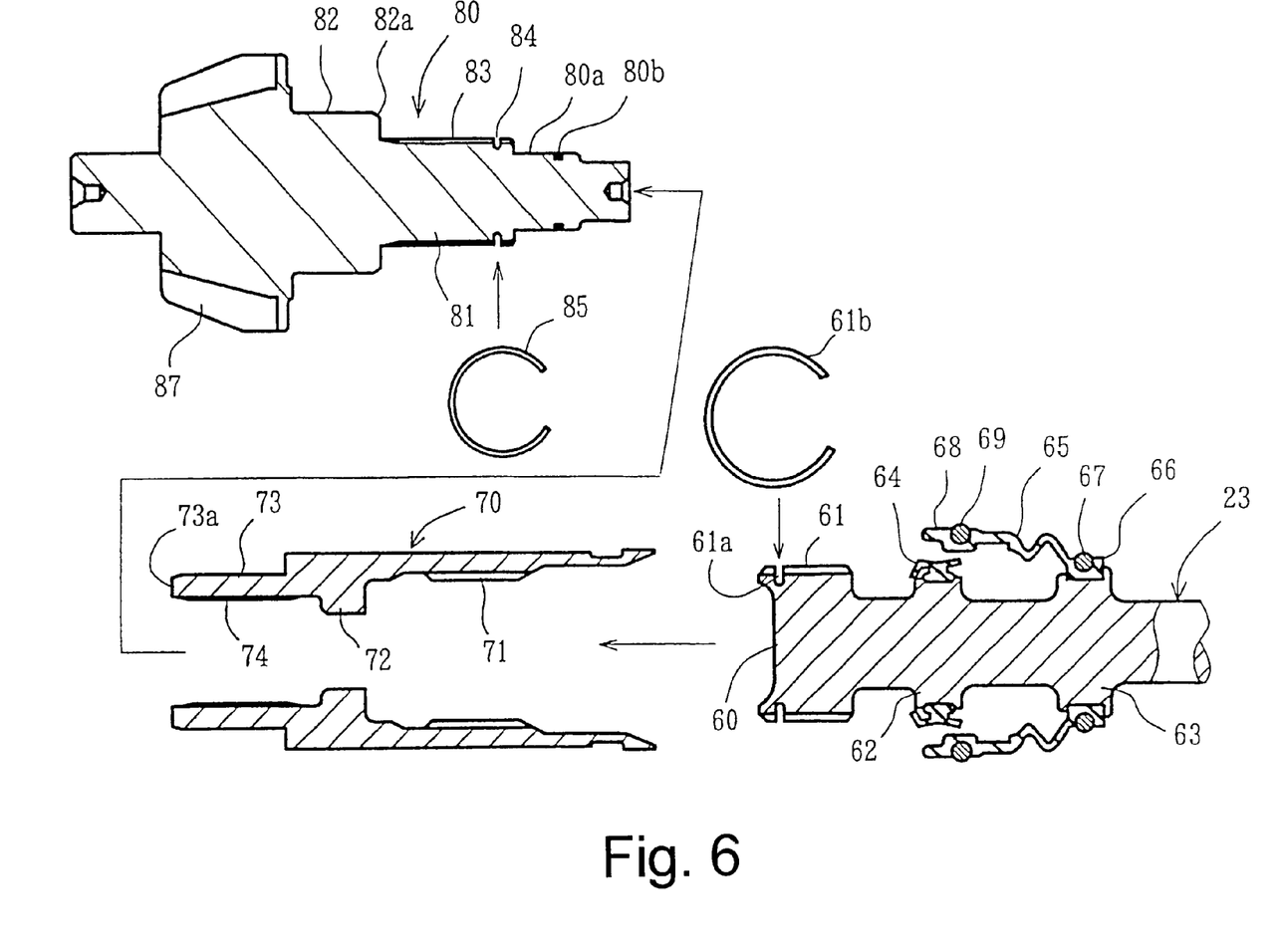
FIG. 6 is a view illustrating the steps of assembling the front wheel side power transmission mechanism.

FIG. 1 is a sectional view showing a connection portion between the front wheel propeller shaft 23 and the front wheel gear case 25, and FIG. 6 is a view showing steps of assembling the front wheel propeller shaft 23 with the front wheel gear case 25. Referring to FIG. 1, a spline 61 is formed on the outer periphery of a front end portion 60 of the front wheel propeller shaft 23, and two large-diameter portions 62 and 63 longitudinally spaced from each other are provided on the front wheel propeller shaft 23 on a rear side opposite from the front end portion 60.

A seal 64 is provided on the outer periphery of the forward side large-diameter portion 62, and one end (small-diameter side end 66) of a rubber boot 65 is fastened, by a band 67, to the outer periphery of the rear side large-diameter portion 63. The large-diameter side end 68 of a rubber boot 65 located on the other end is fastened by a band 69 to the outer periphery of the rear end of a joint 70.

The inner peripheral surface of the rear end of the joint 70 is in slidable contact with the seal 64. A spline 71 is formed in the inner peripheral surface of an intermediate portion of the joint 70. The spline 71 is formed longitudinally forward of the portion of the joint 70 in contact with the seal 64. The spline 61 is formed on the front end portion 60 of the front wheel propeller shaft 23 and corresponds to the spline 71 formed in the intermediate portion of the joint 70. Consequently, the front wheel propeller shaft 23 is spline-connected and is therefore integrally and rotatably connected with the joint 70. A C-shaped clip 61b is previously fitted in an annular groove 61a formed in the periphery of the front end portion of the spline 61 portion of the front end portion 60 in order to prevent the spline 61 portion from being slipped off from the spline 71 portion. The above slip-off preventive mechanism can be the same type as the slip-off mechanism provided for the connection portion between a pinion gear 80 and the joint 70.

A small-diameter portion 72 is formed on the inner peripheral surface of the joint 70 on a portion located longitudinally forward of the spline 71 portion. A spline 74 is formed in the inner peripheral surface of a front portion 73 and longitudinally forward of the small-diameter portion 72 of the joint 70. Therefore, the front portion 73 is spline-connected and integrally rotatably connected to a pinion gear 80 provided in the front wheel gear case 25. The pinion gear 80 has a small-diameter boss 81 and a large-diameter boss 82. A spline 83 is formed on the outer periphery of the small-diameter boss 81. The spline 74 formed in the front portion 73 is fitted to the spline 83 formed on the small-diameter boss 81. In this case, a front end 73a is butted to a stepped portion 82a of the large-diameter boss 82.

As seen in FIG. 1 and FIG. 1a, an annular clip groove 84 is formed in a portion of the small-diameter boss 81. A C-shaped clip 85 is fitted in the groove 84 in order to prevent the spline 74 of the joint 70 from slipping off the spline 83 portion of the pinion gear 80. The joint 70 is thus integrally connected to the pinion gear 80. An enlarged view in FIG. 1a shows the spline-connection arrangement in which the joint 70 is prevented from slipping off the pinion gear 80 by the C-shaped clip 85.

Specifically, when the C-shaped clip 85 is fitted in the clip groove 84 formed in the small-diameter boss 81 of the pinion gear 80 and the front portion 73 of the joint 70 is fitted around the small-diameter boss 81 of the pinion gear 80, the diameter of the C-shaped clip 85 is reduced to allow the fitting of the spline 74 to the spline 83. The diameter then increases and is restored to a value equivalent to that of the root of the spline 74. As a result, the spline 74 is prevented from slipping off in the axially direction from the spline 83.

The front end portion 60 of the front wheel propeller shaft 23 is spline-connected and therefore integrally connected to the rear portion of the joint 70. At this time, the spline 61 is prevented from being slipped off from the spline 71 by the C-shaped clip 61b. Further, an extended portion 80a, which has a diameter smaller than that of the small-diameter boss 81 and which projects from the small-diameter boss 81, is in close-contact with the inner peripheral surface of the small-diameter portion 72 via an O-ring 80b.

A bearing 86 is fitted on the outer periphery of the large-diameter boss 82 (see FIG. 1). The pinion gear 80 is rotatably supported by the front wheel gear case 25 via the bearing 86. The pinion gear 80 is meshed with a ring gear 88 which is rotatably supported by the front wheel gear case 25 in such a manner as to be coaxial with the front wheel axles 2a of the vehicle. A drive force is transmitted from the pinion gear 80 to the front wheel axles 2a via the ring gear 88.

Figure 7:
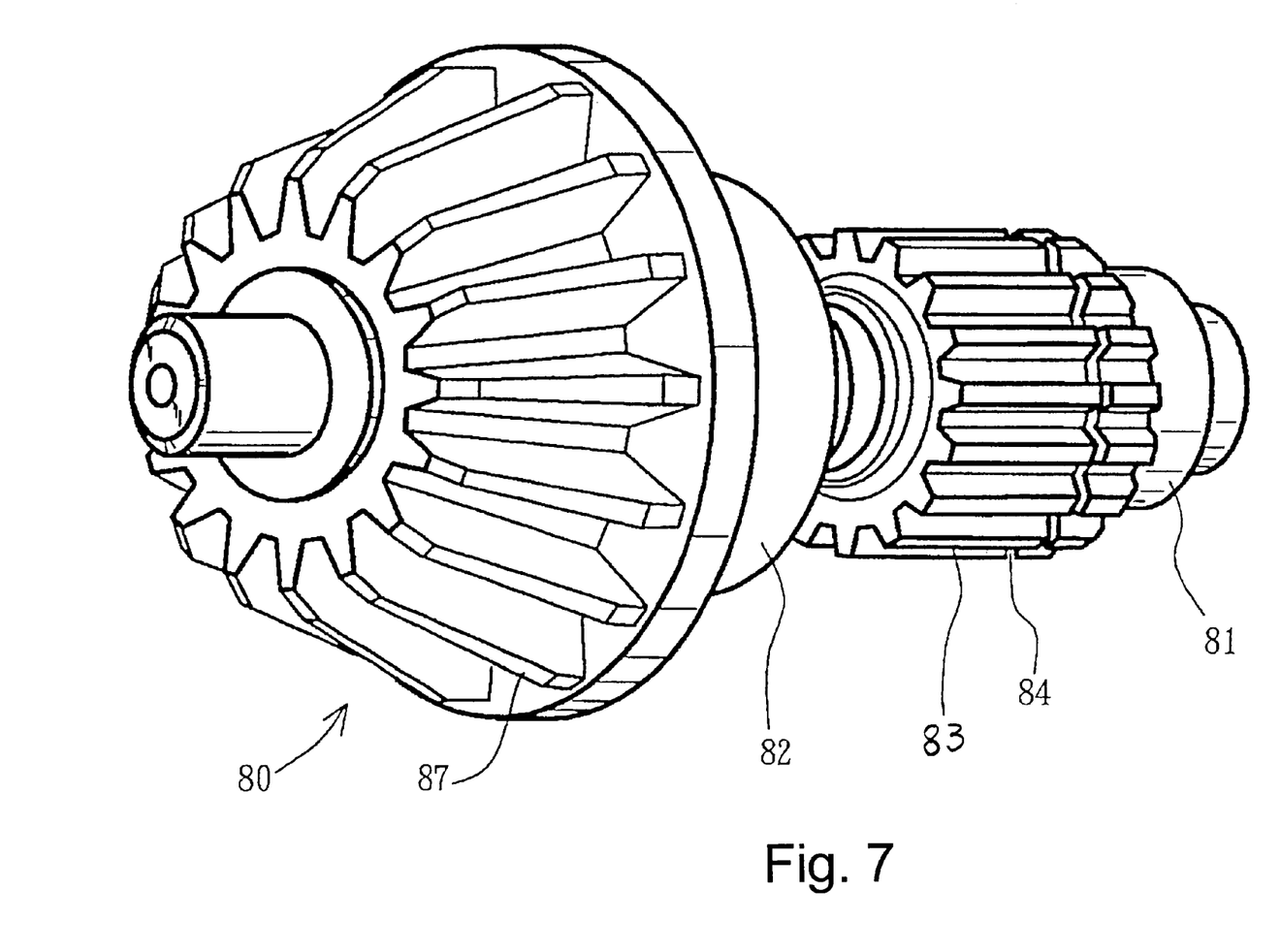
FIG. 7 is a perspective view of a pinion gear.

FIG. 7 is a perspective view of the pinion gear 80. As shown in FIG. 7, teeth 87 of the pinion gear 80 are each formed into a straight shape. The pinion gear 80 having the straight teeth 87 acts to transmit a reaction force, applied upon acceleration or deceleration, in the rotational direction. However, the pinion gear does not substantially act to transmit a reaction force in the axial direction. Unlike a conventional bevel gear, the pinion gear 80 according to this embodiment does not act to transmit a load in the spline's axial slip-off direction.

Figures 8, 8A:
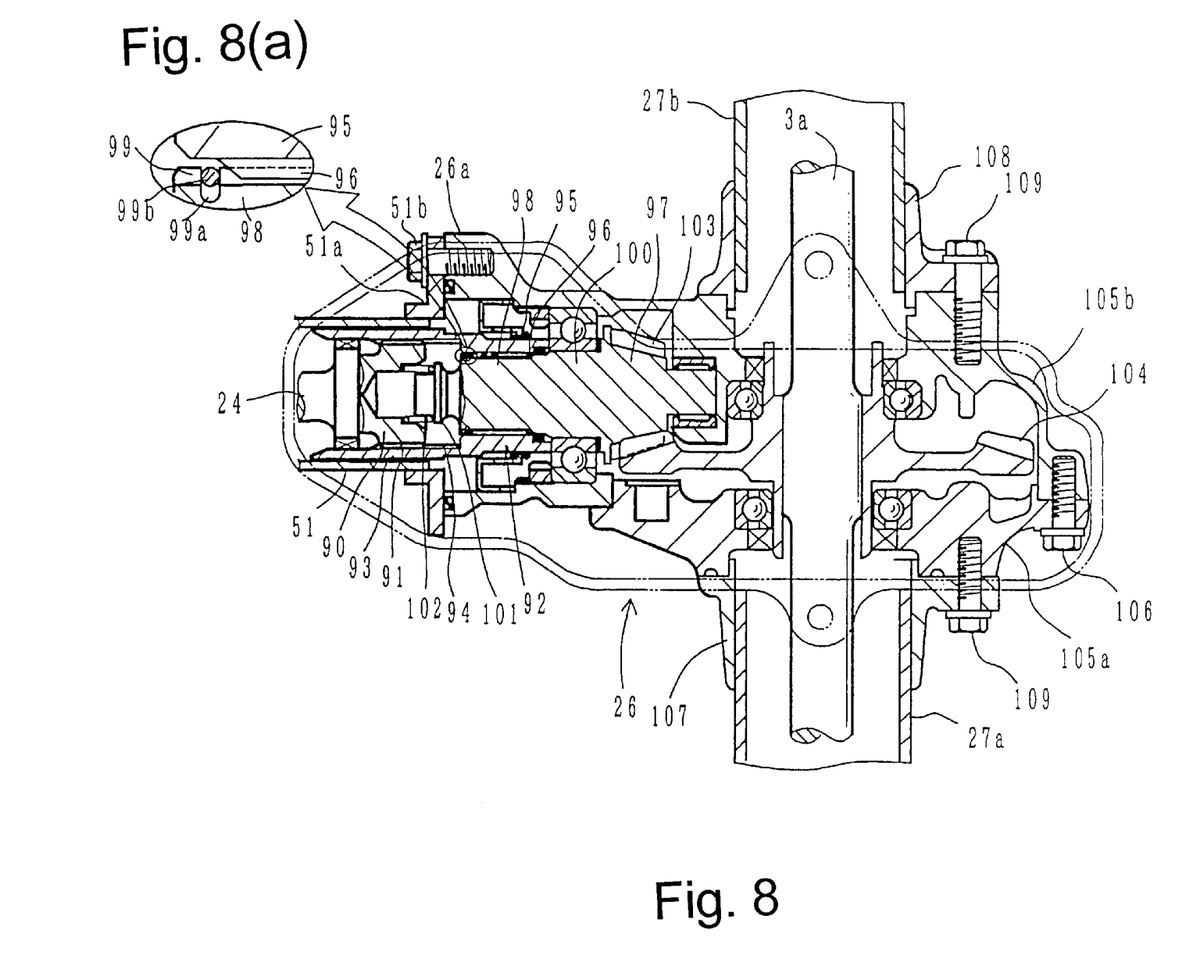
FIG. 8 is a sectional view of a rear wheel side power transmission mechanism according to an embodiment of the present invention.
FIG. 8a is an enlarged view of a portion of the rear wheel side power transmission mechanism shown in FIG. 8.

The connection structure between the rear wheel propeller shaft 24 and the rear wheel gear case 26 side is similar to that described above. FIG. 8 is a view, similar to FIG. 1, showing such a connection structure of the rear wheel propeller shaft 24. Referring to FIG. 8, the rear end of the rear swing arm 51 is integrated with the rear wheel gear case 26 by overlapping a flange 51a to the end surface of an inlet portion 26a of the rear wheel gear case 26 and fastening it thereto with bolts 51b. A large-diameter portion 90 formed at the rear end of the rear wheel propeller shaft 24 projects into the rear wheel gear case 26, and a spline 91 formed on the outer peripheral surface of the large-diameter portion 90 is spline-connected to a spline 94 formed on the inner peripheral surface of a front end 93 of a joint 92.

A spline 96 is formed on the inner peripheral surface of a rear portion 95 of the joint 92. The spline 96 is therefore spline-connected to a spline 99 formed on the outer peripheral surface of a small-diameter boss 98 of a pinion gear 97. As shown by an enlarged portion of FIG. 8 in FIG. 8a, the slip-off preventive mechanism for the spline-connection portion uses, like the slip-off preventive mechanism on the front wheel side, a C-shaped clip 99b fitted in an annular groove 99a formed around a front end portion of the spline 99.

Since the C-shaped clip 99b is fitted in the annular groove 99a formed in the small-diameter boss 98 of the pinion gear 97 and the rear portion 95 of the joint 92 is fitted around the small-diameter boss 98 of the pinion gear 97, the diameter of the C-shaped clip 99b is reduced once to allow the spline 96 to pass therethrough. The diameter of the C-shaped clip 99b is restored to a value equivalent to the diamater of the root of the spline 96 after passing the spline 96. As a result, the spline 96 is prevented from slipping off of the spline 99 in the axial direction.

The rear end of the joint 92 is butted to a bearing on the large-diameter boss 100. A spring 102 is contracted between a stepped portion 101 projecting from the front end of the small-diameter boss 98 and the large-diameter portion 90.

Teeth 103 of the pinion gear 97, each of which is formed into a straight shape, are meshed with a ring gear 104 integrally rotatably mounted on the rear wheel axle 3a. The rotational force of the rear wheel propeller shaft 24 is transmitted to the rear wheel axle 3a through the pinion gear 97 and ring gear 104.

The rear wheel gear case 26 is formed by integrating right and left divided cases 105a and 105b to each other with bolts 106. Flanges 107 and 108 are mounted to side surfaces of the divided cases 105a and 105b with bolts 109, respectively. The flanges 107 and 108 are fitted to the outer peripheries of end portions, on the rear wheel gear case 26 side, of the axle pipes 27a and 27b, respectively for supporting the axle pipes 27a and 27b.

Figure 9:
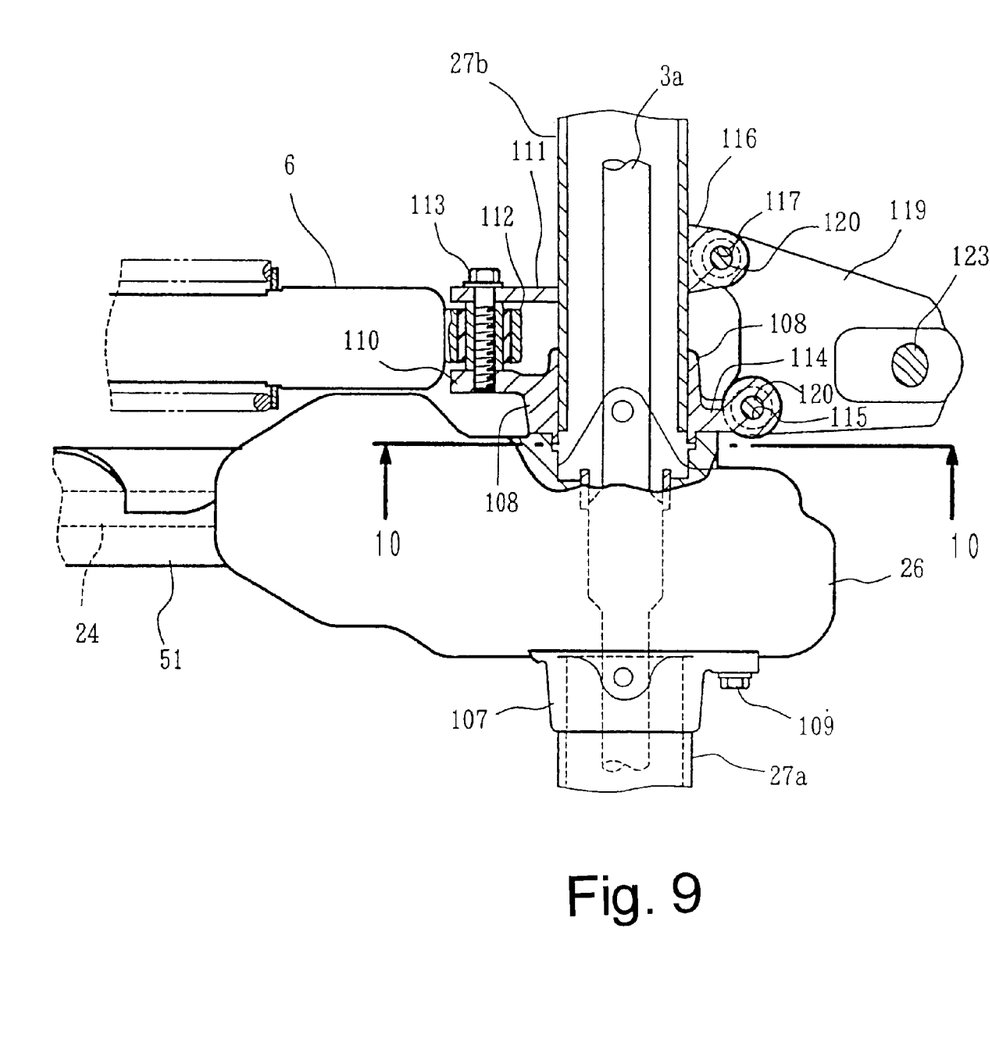
FIG. 9 is a modification of the rear wheel side power transmission mechanism shown in FIG. 8.
Figure 10:
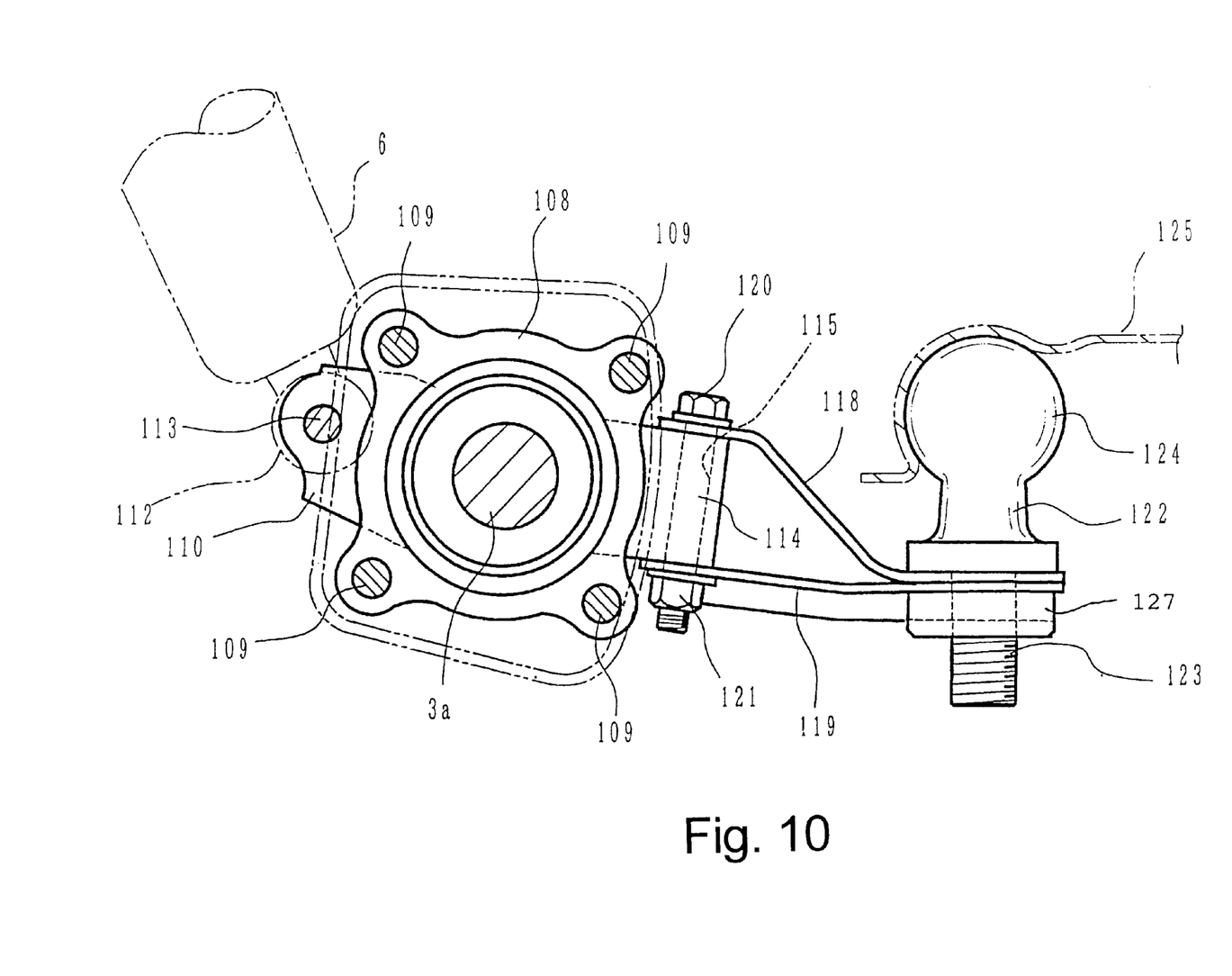
FIG. 10 is a sectional view taken on line 10—10 of FIG. 9.

FIG. 9 shows a connection structure partially modified from that shown in FIG. 8, and FIG. 10 is a sectional view taken on line 10—10 of FIG. 9. Referring to FIGS. 9 and 10, a cushion mounting stay 110 integrally projects forwardly from a flange 108, and a cushion mounting stay 111 is welded at its one end to the axle pipe 27b with a gap maintained between the cushion mounting stays 110 and 111. A boss 112 provided on the lower end of the rear cushion 6 is mounted between these cushion mounting stays 110 and 111 by means of a bolt 113. In addition, a threaded portion in which the bolt 113 is to be screwed is formed in the cushion mounting stay 110.

A hitch mounting stay 114 integrally projects from the rear side of the flange 108. A bolt-insertion hole 115 passes through the thick wall portion of the stay 114 in the vertical direction. A hitch mounting stay 116 is welded to the outer periphery of the axle pipe 27b with a gap kept between the hitch mounting stays 114 and 116. A bolt-insertion hole 117 passes through the thick wall portion of the stay 116 in the vertical direction. A hitch plate 118 overlaps the upper ends of the hitch mounting stays 114 and 116, and a hitch plate 119 overlaps the lower ends of the hitch mounting stays 114 and 116. These hitch plates 118 and 119 are mounted to the hitch mounting stays 114 and 116 by means of bolts 120 passing through the bolt insertion holes 115 and 117 of the hitch mounting stays 114 and 116 and the corresponding nuts 121.

A hitch pin 122 is fixed to the rear ends of the hitch plates 118 and 119 by screwing a nut 127 mounted to the hitch plate 119 around a threaded portion 123 integrally formed on the hitch pin 122. A head 124 of the hitch pin 122 is curved, to which a hook 125 extending from a trailer (not shown) is to be engaged.

With this configuration, the cushion mounting stay 110 and the hitch mounting stay 114 are integrally formed on the flange 108, and accordingly, unlike the prior art structure in which the mounting stays 110 and 114 are separately prepared and welded to the axle pipe 27b, it is possible to simplify the structure, reduce the number of parts, use parts as multi-functional parts, and facilitate the maintenance of the transmission and hitch assembly. If the rear cushion 6 is mounted to the outer side of the rear wheel gear case 26 with respect to the width direction of the vehicular body, the hitch mounting stay 114 may be integrally formed on the flange 108 located on the inner side in the width direction of the vehicular body. Similarly, with this arrangement the cushion mounting stay 110 may be integrally provided on the flange 107 on the outer side of the vehicle with respect to the width direction of the vehicular body, whereby the different members 114 and 110 can be integrated to the flanges 108 and 107, respectively.

The function of an embodiment of the present invention will be described hereinafter. Referring to FIG. 6, the front wheel propeller shaft 23 is connected to the pinion gear 80 as follows: the small-diameter side end portion 66 of the rubber boot 65 is fixed on the outer periphery of the large-diameter portion 63 of the front wheel propeller shaft 23, and in such a state, the rear end of the joint 70 is fitted on the outer periphery of the end portion of the front wheel propeller shaft 23; the large-diameter side end portion 68 of the rubber boot 65 is fixed to the outer periphery of the rear end of the joint 70 by the band 69; and the spline 71 of the joint 70 is spline-connected and therefore integrally and rotatably connected to the spline 61 of the front end portion 60. Consequently, the joint 70 is sub-assembled with the front wheel propeller shaft 23.

The front portion 73 of the joint 70 sub-assembled with the front wheel propeller shaft 23 is fitted on the small-diameter boss 81 on which the C-shaped clip 85 is previously mounted on the pinion gear 80. The spline 74 is spline-connected and integrally and rotatably connected to the spline 83. When the front end of the joint 70 is butted to the stepped portion of the boss 82 of the pinion gear 80, the C-shaped clip 85 in the clip groove 84 is restored, whereby the joint 70 is prevented from slipping off of the pinion gear 80.

In this way, the joint 70 can be fitted to the small-diameter boss 81 of the pinion gear 80 in such a manner as to be integrally rotatable therewith and not to be slipped off therefrom, so that the front wheel propeller shaft 23 can be readily and simply connected to the pinion gear 80 via the joint 70 sub-assembled with the front wheel propeller shaft 23. Accordingly, it is possible to omit conventional fastening work using a nut and it further eliminates the need of threading the boss of the pinion gear 80. Consequently, the number of machining steps and required machining parts are reduced by omitting the nut. Further, since the C-shaped clip 85 is used as the means of engaging the joint 70 to the pinion gear 80 in the axial slip-off direction, it is possible to simply and inexpensively connect the joint 70 to the pinion gear 80 without increasing the overall weight of the vehicle.

Since the joint 70 is sub-assembled with the front wheel propeller shaft 23, it is possible to reduce the assembling effort. Since the outer periphery of the connection portion between the joint 70 and the front wheel propeller shaft 23 is covered with the boot 65 upon sub-assembly of the joint 70 with the front wheel propeller shaft 23, it is possible to eliminate the need of mounting the boot 65 while connecting the front wheel propeller shaft 23 to the pinion gear 80 side. This further reduces the assembling effort by further simplifying normally difficult mounting work.

The clip groove 84 can be easily positioned by abutting the leading end of the joint 70 to the stepped portion 82a of the large-diameter boss 82 of the pinion gear 80. Further, since the bearing 86 for rotatably supporting the pinion gear 80 can be configured as a common small-sized bearing, it is possible to reduce the material cost and eliminate specialized parts requirements.

Since the teeth 87 of the pinion gear 80 are each formed into a straight shape, a reaction force applied upon acceleration/deceleration is, unlike the prior art bevel gear, transmitted not in the axial direction but in the rotational direction. In other words, the reaction force does not act as a load applied in the axial direction of the shafts, so that it is further possible to omit the provision of the nut.

The function and effect on the rear wheel side are the same as those on the front wheel side. In addition, the present invention is not limited to the above-described embodiment but can be applied to various types of vehicles by suitably modifying the specific terms described in the embodiment. For example, the C-shape clip, which is used as the means of engaging the joint to the pinion gear, may be replaced with a different known retaining element or means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shaft drive power transmission for a vehicle in which a propeller drive shaft is connected to a pinion gear on a gear case side of the propeller drive shaft, said transmission comprising:

a boss of said pinion gear having at least a first diameter portion, a second diameter portion and a third diameter portion, wherein said third diameter portion is larger in diameter than said second diameter portion and said second diameter portion is larger in diameter than said first diameter portion and said first diameter portion is adjacent to said propeller drive shaft;

a joint for connecting the pinion gear to the propeller drive shaft, said joint having a shaft end and a pinion end, wherein said shaft end of said joint is operatively spline-connected to said propeller shaft with a spline connection and said pinion end of said joint is operatively spline-connected to said third diameter portion of said boss of said pinion gear with a spline connection and in such a manner as to be integrally connected and rotatable therewith, and wherein the joint is prevented from slipping off of the boss of said pinion gear.

2. The shaft drive power transmission according to claim 1, wherein the connection portion between said propeller shaft and said joint is covered with a boot.

3. The shaft drive power transmission according to claim 1, wherein the leading end of said joint is abutted to a stepped portion of a fourth diameter portion of the boss of said pinion gear, wherein said fourth diameter portion is larger in diameter than said third diameter portion.

4. The shaft drive power transmission according to claim 1, wherein the teeth of said gear are each formed with a straight shape.

5. The shaft drive power transmission according to claim 4, wherein the teeth of said pinion gear mesh with a ring gear driveably engaging a right wheel axle and a left wheel axle.

6. The shaft drive power transmission according to claim 1, further comprising:

an annular clip groove formed in the third diameter portion of the boss;

a C-shaped clip fitted into the groove in order to prevent the spline connection of the joint and the boss from slipping off the pinion gear.

7. The shaft drive power transmission according to claim 1 further comprising a boot located on the shaft end of said joint and fastened to said joint by a band.

8. A shaft drive power transmission for a vehicle, said transmission comprising:

an output shaft transmitting power from a power unit of the vehicle;

a front wheel propeller shaft connected to a front end of said output shaft;

a right front wheel axle and a left front wheel axle;

a front wheel drive case;

a pinion gear for distributing drive forces from said front wheel propeller shaft to said right and left front wheel axles; and a boss of said pinion gear having at least a first diameter portion, a second diameter portion and a third diameter portion, wherein said third diameter portion is larger in diameter than said second diameter portion and said second diameter portion is larger in diameter than said first diameter portion;

a joint for connecting the pinion gear to the propeller drive shaft, said joint having a shaft end and a pinion end, wherein said shaft end of said joint is operatively spline-connected to said propeller shaft with a spline connection and said pinion end of said joint is operatively spline-connected to said third diameter portion of said boss of said pinion gear with a spline connection and in such a manner as to be integrally connected and rotatable therewith, and wherein the joint is prevented from slipping off of the boss of said pinion gear.

9. The shaft drive power transmission according to claim 8, wherein the leading end of said joint is abutted to a stepped portion of a fourth diameter portion of said boss of said pinion gear, wherein said fourth diameter portion is larger in diameter than said third diameter portion.

10. The shaft drive power transmission according to claim 9, said transmission further comprising:

a rear wheel propeller shaft connected to a rear end of said output shaft;

a right rear wheel axle and a left rear wheel axle;

a rear wheel drive case;

a rear pinion gear for distributing drive forces from said rear wheel propeller shaft to said right and left rear wheel axles; and a boss of said rear pinion gear having at least a first diameter portion, a second diameter portion and a third diameter portion, wherein said third diameter portion is larger in diameter than said second diameter portion and said second diameter portion is larger in diameter than said first diameter portion;

a rear joint for connecting the rear pinion gear to the propeller drive shaft, said rear joint having a shaft end and a pinion end, wherein said shaft end of said rear joint is operatively spline-connected to said propeller shaft with a spline connection and said pinion end of said rear joint is operatively spline-connected to said third diameter portion of said boss of said rear pinion gear with a spline connection and in such a manner as to be integrally connected and rotatable therewith, and wherein the joint is prevented from slipping off of the boss of said pinion gear.

11. The shaft drive power transmission according to claim 10, wherein the pinion end of said rear joint is abutted to stepped portions of a fourth diameter portion of said pinion gear.

12. The shaft drive power transmission according to claim 11, further comprising:

an annular clip groove formed in a portion of each third diameter portion of said respective boss;

a C-shaped clip fitted into the groove in order to prevent the spline connection of the respective joint from slipping off the respective pinion gear.

13. The shaft drive power transmission according to claim 10, wherein the teeth of each pinion gear are each formed having a straight shape.

* * * * *